(12) United States Patent
Moghe et al.

(10) Patent No.: US 11,704,334 B2
(45) Date of Patent: Jul. 18, 2023

(54) SYSTEM AND METHOD FOR HYPERCONVERGENCE AT THE DATACENTER

(71) Applicant: Nutanix, Inc., San Jose, CA (US)

(72) Inventors: Dheer Moghe, Bangalore (IN);
Gowtham Alluri, San Jose, CA (US);
Karan Gupta, San Jose, CA (US);
Roger Liao, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 16/820,600

(22) Filed: Mar. 16, 2020

(65) Prior Publication Data

US 2021/0173852 A1    Jun. 10, 2021

(30) Foreign Application Priority Data

Dec. 6, 2019  (IN) .............................. 201941050392

(51) Int. Cl.
*G06F 16/00* (2019.01)
*G06F 16/27* (2019.01)

(52) U.S. Cl.
CPC .................................. *G06F 16/27* (2019.01)

(58) Field of Classification Search
CPC ....................................................... G06F 16/27
See application file for complete search history.

(56) References Cited

U.S. PATENT DOCUMENTS

| | | |
|---|---|---|
| 5,802,309 A | 9/1998 | Cook et al. |
| 6,209,128 B1 | 3/2001 | Gerard et al. |
| 6,775,673 B2 | 8/2004 | Mahalingam et al. |
| 7,461,912 B2 | 12/2008 | Kamiyama et al. |
| 7,653,668 B1 | 1/2010 | Shelat et al. |
| 7,685,109 B1 | 3/2010 | Ransil et al. |

(Continued)

FOREIGN PATENT DOCUMENTS

EP    4 006 737 A1    6/2022

OTHER PUBLICATIONS

B+ Tree Indexes. http://web.csulb.edu/~amonge/classes/common/db/B TreeIndexes.html, Aug. 4, 2018, pp. 1-7 (2018).

(Continued)

*Primary Examiner* — Khanh B Pham
(74) *Attorney, Agent, or Firm* — Foley & Lardner LLP

(57) ABSTRACT

An illustrative embodiment disclosed herein is an apparatus including a processor with programmed instructions to receive a request to process storage data using a compute application, determine that a first location of the storage data is in a first storage resource in a first cluster of compute, storage, and network resources, determine that a second location of the compute application is in a first compute resource of a second cluster of compute, storage, and network resources, determine whether the first cluster includes a second compute resource that is compatible with the compute application, and respectively, either, based on a first compatibility determination, migrate the compute application from the first compute resource to the second compute resource, or, based on a second compatibility determination, replicate the storage data from the first storage resource to a second storage resource in the second cluster.

24 Claims, 3 Drawing Sheets

(56) References Cited

U.S. PATENT DOCUMENTS

| | | | |
|---|---|---|---|
| 7,721,044 B1 | 5/2010 | Chatterjee et al. | |
| 8,019,732 B2 | 9/2011 | Paterson-Jones et al. | |
| 8,166,128 B1 | 4/2012 | Faulkner et al. | |
| 8,250,033 B1 | 8/2012 | Desouter et al. | |
| 8,352,424 B2 | 1/2013 | Zunger et al. | |
| 8,549,518 B1 | 10/2013 | Aron et al. | |
| 8,554,724 B2 | 10/2013 | Zunger | |
| 8,601,473 B1 | 12/2013 | Aron et al. | |
| 8,799,222 B2 | 8/2014 | Marathe et al. | |
| 8,849,759 B2 | 9/2014 | Bestler et al. | |
| 8,850,130 B1 | 9/2014 | Aron et al. | |
| 8,863,124 B1 | 10/2014 | Aron | |
| 8,930,693 B2 | 1/2015 | Holt et al. | |
| 9,003,335 B2 | 4/2015 | Lee et al. | |
| 9,009,106 B1 | 4/2015 | Aron et al. | |
| 9,043,372 B2 | 5/2015 | Makkar et al. | |
| 9,043,567 B1 | 5/2015 | Modukuri et al. | |
| 9,052,942 B1 | 6/2015 | Barber et al. | |
| 9,069,708 B2 | 6/2015 | Gill et al. | |
| 9,069,983 B1 | 6/2015 | Nijjar | |
| 9,256,498 B1 | 2/2016 | Leibowitz et al. | |
| 9,336,132 B1 | 5/2016 | Aron et al. | |
| 9,405,806 B2 | 8/2016 | Lysne et al. | |
| 9,652,265 B1 | 5/2017 | Narayanasamy et al. | |
| 9,705,970 B2 * | 7/2017 | Pomerantz | H04L 47/70 |
| 9,747,287 B1 | 8/2017 | Bhardwaj et al. | |
| 9,772,866 B1 | 9/2017 | Aron et al. | |
| 9,805,054 B2 | 10/2017 | Davis et al. | |
| 10,003,650 B2 | 6/2018 | Shetty et al. | |
| 10,296,255 B1 * | 5/2019 | Tummala | G06F 3/0689 |
| 10,380,078 B1 | 8/2019 | Kumar et al. | |
| 10,409,837 B1 | 9/2019 | Schmidt et al. | |
| 10,528,262 B1 | 1/2020 | Shmuylovich et al. | |
| 10,565,230 B2 | 2/2020 | Zheng et al. | |
| 10,592,495 B1 | 3/2020 | Shami et al. | |
| 10,691,464 B1 | 6/2020 | Drego et al. | |
| 10,725,826 B1 | 7/2020 | Sagar et al. | |
| 10,740,302 B2 | 8/2020 | Slik et al. | |
| 2001/0034733 A1 | 10/2001 | Prompt et al. | |
| 2002/0065776 A1 | 5/2002 | Calder et al. | |
| 2002/0078065 A1 | 6/2002 | Agulhon | |
| 2003/0023587 A1 | 1/2003 | Dennis et al. | |
| 2003/0145310 A1 | 7/2003 | Thames et al. | |
| 2003/0172094 A1 | 9/2003 | Lauria et al. | |
| 2003/0191745 A1 | 10/2003 | Jiang et al. | |
| 2004/0186826 A1 | 9/2004 | Choi et al. | |
| 2006/0041661 A1 | 2/2006 | Erickson et al. | |
| 2006/0047636 A1 | 3/2006 | Mohania et al. | |
| 2006/0080646 A1 | 4/2006 | Aman | |
| 2006/0161704 A1 | 7/2006 | Nystad et al. | |
| 2007/0088744 A1 | 4/2007 | Webber et al. | |
| 2008/0034307 A1 | 2/2008 | Cisler et al. | |
| 2010/0042673 A1 * | 2/2010 | Dayley | G06F 11/2028 709/203 |
| 2011/0082962 A1 | 4/2011 | Horovitz et al. | |
| 2011/0137966 A1 | 6/2011 | Srinivasan et al. | |
| 2011/0185355 A1 | 7/2011 | Chawla et al. | |
| 2011/0213884 A1 | 9/2011 | Ferris et al. | |
| 2012/0096052 A1 | 4/2012 | Tolia et al. | |
| 2012/0096205 A1 | 4/2012 | Velayudhan et al. | |
| 2012/0331065 A1 | 12/2012 | Aho et al. | |
| 2012/0331243 A1 | 12/2012 | Aho et al. | |
| 2013/0054523 A1 | 2/2013 | Anglin et al. | |
| 2013/0198472 A1 | 8/2013 | Fang et al. | |
| 2013/0246431 A1 | 9/2013 | Ahuja et al. | |
| 2013/0332608 A1 | 12/2013 | Shiga et al. | |
| 2015/0012571 A1 | 1/2015 | Powell et al. | |
| 2015/0046586 A1 | 2/2015 | Zhang et al. | |
| 2015/0046600 A1 * | 2/2015 | Kim | H04L 67/1095 709/232 |
| 2015/0254325 A1 | 9/2015 | Stringham | |
| 2015/0378767 A1 | 12/2015 | Tarasuk-Levin et al. | |
| 2016/0048408 A1 | 2/2016 | Madhu et al. | |
| 2016/0162547 A1 | 6/2016 | Morris | |
| 2016/0207673 A1 | 7/2016 | Shlonsky et al. | |
| 2016/0275125 A1 | 9/2016 | Drobychev et al. | |
| 2017/0075909 A1 | 3/2017 | Goodson et al. | |
| 2017/0091235 A1 | 3/2017 | Yammine et al. | |
| 2017/0109421 A1 | 4/2017 | Stearn et al. | |
| 2017/0235764 A1 | 8/2017 | Sharpe et al. | |
| 2017/0242746 A1 | 8/2017 | King et al. | |
| 2017/0344575 A1 | 11/2017 | Naylor et al. | |
| 2017/0351450 A1 | 12/2017 | Brandl et al. | |
| 2018/0205791 A1 | 7/2018 | Frank et al. | |
| 2018/0292999 A1 | 10/2018 | Nadkarni | |
| 2018/0349463 A1 | 12/2018 | Bernhardy et al. | |
| 2019/0004863 A1 | 1/2019 | Mainali et al. | |
| 2019/0050296 A1 | 2/2019 | Luo et al. | |
| 2019/0196885 A1 | 6/2019 | Song et al. | |
| 2019/0207929 A1 | 7/2019 | Koorapati et al. | |
| 2019/0213175 A1 | 7/2019 | Kong et al. | |
| 2019/0213179 A1 | 7/2019 | McHugh et al. | |
| 2019/0227713 A1 | 7/2019 | Parthasarathy | |
| 2019/0243547 A1 | 8/2019 | Duggal et al. | |
| 2019/0324874 A1 * | 10/2019 | Gill | G06F 11/2094 |
| 2019/0354544 A1 | 11/2019 | Hertz et al. | |
| 2019/0370362 A1 | 12/2019 | Mainali et al. | |
| 2019/0384678 A1 | 12/2019 | Samprathi et al. | |
| 2020/0004570 A1 * | 1/2020 | Glade | G06F 9/45558 |
| 2020/0036787 A1 | 1/2020 | Gupta et al. | |
| 2020/0042364 A1 * | 2/2020 | Kumar Shimoga Manjunatha | H04L 67/1008 |
| 2020/0104222 A1 | 4/2020 | Ramamoorthi et al. | |
| 2020/0117637 A1 | 4/2020 | Roy et al. | |
| 2020/0195743 A1 | 6/2020 | Jiang et al. | |
| 2020/0201724 A1 | 6/2020 | Saito et al. | |
| 2020/0250044 A1 | 8/2020 | Sharma et al. | |
| 2020/0310859 A1 | 10/2020 | Gupta et al. | |
| 2020/0311116 A1 | 10/2020 | Anvaripour et al. | |
| 2020/0314174 A1 * | 10/2020 | Dailianas | G06F 9/505 |
| 2020/0319909 A1 | 10/2020 | Jawahar et al. | |
| 2020/0387510 A1 | 12/2020 | Ransil et al. | |
| 2020/0394078 A1 | 12/2020 | Taneja et al. | |
| 2021/0026661 A1 | 1/2021 | Sulcer et al. | |
| 2021/0034350 A1 | 2/2021 | Chen et al. | |
| 2021/0072917 A1 | 3/2021 | Surla et al. | |
| 2021/0124651 A1 | 4/2021 | Srinivasan et al. | |
| 2021/0181962 A1 | 6/2021 | Dai et al. | |
| 2021/0406224 A1 | 12/2021 | Neufeld et al. | |

OTHER PUBLICATIONS

Stopford. Log Structured Merge Trees, http://www.benstopford.com/2015/02/14/ log-structured-merge-trees, 2015, pp. 1-8 (2015).

"Adding Objects to Versioning—Enabled Buckets", from https://docs.aws.amazon.com/AmazonS3/latest/dev/AddingObjectstoVersioningEnabledBuckets.html, (Oct. 2, 2019).

"Configure a Pod to Use a ConfigMap", from https://kubernetes.io/docs/tasks/configure-pod-container/configure-pod-configmap/,(Oct. 2, 2019).

"Deployments", from https://kubernetes.io/docs/concepts/workloads/controllers/deployment/,(Oct. 2, 2019).

"Retrieving Object Versions", from https://docs.aws.amazon.com/AmazonS3/latest/dev/RetrievingObjectVersions.html, (Oct. 2, 2019).

"Set up Cluster Federation with Kubefed—Kubernetes", from https://v1-14.docs.kubenetes.io/docs/tasks/federation/set-up-cluster-federation-kubefed/, (Apr. 17, 2020).

"Volumes", from https://kubernetes.io/docs/concepts/storage/volumes/, (Oct. 2, 2019).

Cano, Ignacio, et al. "Curator: Self-Managing Storage for Enterprise Clusters" (Mar. 27, 2017), from https://www.usenix.org/conference/nsdi17/.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

(56) References Cited

OTHER PUBLICATIONS

Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date byArchive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
The Nutanix Bible; from https://nutanixbible.com/; accessed on Jan. 12, 2016.
The Nutanix Bible; from https://nutanixbible.com/; accessed on Jun. 25, 2018.
The Nutanix Bible; from https://nutanixbible.com/; accessed on Jan. 3, 2017.
The Nutanix Bible; from https://nutanixbible.com/; accessed on Jan. 3, 2018.
The Nutanix Bible; from https://nutanixbible.com/; accessed on Sep. 4, 2015.
The Nutanix Bible; from https://nutanixbible.com/; accessed on Jan. 8, 2019.
The Nutanix Bible; from https://nutanixbible.com/; accessed on Jun. 8, 2017.
The Nutanix Bible; from https://nutanixbible.com/; accessed on Jun. 9, 2016.
"AWS Pricing"; Amazon Web Services; https://aws.amazon.com/pricing/; Webpage accessed on Jun. 23, 2021; pp. 1-9.
"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.
"IT Service Provider Technology solutions and Services"; HPE—Hewlett Packard, https://www.hpe.com/us/en/solutions/service-providers.html?parentPage=/us/en/solutions/service-providers; Webpage accessed on Jun. 23, 2021; pp. 1-6.
"Managed VMware Cloud Services"; VMware; https://cloud.vmware.com/providers/managed-services-provider; Webpage accessed on Jun. 23, 2021; pp. 1-5.
"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.
"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.
"PerVirtual Machine Licensing"; VMware PerVM Pricing & Licensing Help; https://www.vmware.com/support/support-resources/licensing/per-vm.html; Webpage accessed on Jun. 23, 2021; pp. 1-7.
"Storage Tiering"; VMWARE Docs; https://docs.vmware.com/en/VMware-Validated-Design/5.0/com.vmware.vvd.sddc-design.doc/GUID-20D2BC02-4500-462F-A353-F9B613CC07AC.html; webpage accessed on Jun. 18, 2021; pp. 1-3.
"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.
"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.
Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.
Luis Ayuso; "How to Report Monthly Usage with the Flex Pricing Model"; VMware Cloud Provider Blog; May 20, 2019; pp. 1-6.
Luis Ayuso; "How to Sign Up for the new VCPP Flex Pricing Model"; VMware Cloud Provider Blog; May 20, 2019; pp. 1-6.
Luis Ayuso; "New VCPP Pricing Model Simplifies Delivering Services"; VMware Cloud Provider Blog; May 20, 2019; pp. 1-6.
Mike Deck; "Building and Maintaining an Amazon S3 Metadata Index without Servers"; AWS Big Data Blog; https://aws.amazon.com/blogs/big-data/building-and-maintaining-an-amazon-s3-metadata-index-without-servers/; Aug. 12, 2015; pp. 1-6.
"Creating an NFS file share"; AWS Storage Gatewa—User Guide; https://docs.aws.amazon.com/storagegateway/latest/userguide/CreatingAnNFSFileShare.html; webpage accessed on Oct. 28, 2020; pp. 1-10.
"SwiftOnFile"; Object Storage-Gluster Docs; v: releases.7.0beta1; https://staged-gluster-docs.readthedocs.io/en/release3.7.0beta1/Administrator%20Guide/Object%20Storage/; webpage accessed on Oct. 28, 2020; pp. 1-2.
Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.
Wambler, Choosing a Primary Key: Natural or Surrogate? http://www.agiledata.org/essays/keys.html, 2018, pp. 1-4 (2018).
"NetApp ONTAP 9.7 Announced—StorageReview.com," (Jun. 14, 2019), https://www.peakresources.com/netapp-ontap-9-6-release-notes-and-thoughts/, pp. 1-5.
"Xml and More: OCI?Knowing Object Storage Basics" (Jan. 13, 2019), http://xmlandmore.blogspot.com/2019/01/ociknowing-object-storage-basics.html, pp. 1-6.
Dellemc, "Elastic Cloud Storage (ECS)," (Aug. 2017), https://repository.usc.edu/sites/repository.usc.edu/files/ecs_overview.pdf. pp. 1-57.
Dubinsky Leon, "Behind the scenes of Cloud Spanner's ExecuteQuery request|Google Cloud Blog," (Jan. 7, 2021), https://cloud.google.com/blog/topics/developers-practitioners/behind-the-scenes-of-cloud-spanners-executequery-request, pp. 1-7.
FireEye, "Building Scalable and Responsive Big Data Interfaces with AWS Lambda | AWS Big Data Blog," (Jul. 10, 2015), https://aws.amazon.com/blogs/big-data/building-scalable-and-responsive-big-data-interfaces-with-aws-lambda/, pp. 1-10.
Guess A.R., "Cloudian HyperStore 7 Multi-Cloud Data Management Unifies Public Cloud and On-Premises Storage—DATAVERSITY," (Jan. 29, 2018), https://www.dataversity.net/cloudian-hyperstore-7-multi-cloud-data-management-unifies-public-cloud-premises-storage/, pp. 1-4.
NetApp, "A Unified Platform for Cloud Storage Infrastructure," (Oct. 26, 2020), https://cloud.netapp.com/blog/cvo-blg-one-unified-platform-for-cloud-storage-infrastructure-and-data-services, pp. 1-8.
NetApp, "StorageGRID Solves Your Unstructured Data Management Problems|NetApp Blog," (Apr. 17, 2019), https://www.netapp.com/blog/storagegrid-solves-your-unstructured-data-management-problems/, pp. 1-6.
Patel Kiran, Goynes Eddie, "Lower latency with AWS Elemental Mediastore chunked object transfer|AWS Media Blog," (Jul. 2, 2019), https://aws.amazon.com/blogs/media/lower-latency-with-aws-elemental-mediastore-chunked-object-transfer/, pp. 1-6.
VMware, "Introducing HCX Enterprise—Cloud Blog—VMware," (Aug. 8, 2019), https://blogs.vmware.com/cloud/2019/08/08/introducing-hcx-enterprise/, pp. 1-6.
VMware, "VMware HCX Enterprise: Non-vSphere to vSphere Workload Migration—Cloud Blog—VMware," (Aug. 8, 2019), https://blogs.vmware.com/cloud/2019/08/08/vmware-hcx-enterprise-non-vsphere-vsphere-workload-migration/, pp. 1-7.
VMware, "VMware Object Storage Interoperability Service-Development Guide," (Sep. 2021), https://www.vmware.com/content/dam/digitalmarketing/vmware/en/pdf/docs/vmware-object-storage-interoperability-service-development-guide.pdf, pp. 1-19.
Pritchard, Stephen, "Object Storage: On Prem, in the cloud and hybrid," (Sep. 27, 2018), https://www.computerweekly.com/news/252449283/Object-storage-On-prem-in-the-cloud-and-hybrid, pp. 1-8.
"Choosing a load balancer for your object storage environment", NetApp 2020.
"NetApp StorageGRID", NetApp 2022.
"Tutorial: Transferring data from on-premises storage to Amazon S3 in a different AWS account", https://docs.aws.amazon.com/datasync/latest/userguide/s3-cross-account-transfer.html, accessed Dec. 12, 2022.

(56) References Cited

OTHER PUBLICATIONS

"What is AWS Data Sync?", htttps://docs.aws.amazon.com/datasync/latest/userguide/what-is-datasync.html, accessed Dec. 12, 2022.
Amazon, "Copy your data between on premises object storage and AWS using AWS DataSync", Jul. 27, 2020, https://aws.amazon.com/about-aws/whats-new/2020/07/copy-your-data-between-on-premises-object-storage-and-aws-using-aws-datasync/.
Cloudian, "HyperBalance Load Balancer", https://cloudian.com/products/hyperbalance/, accessed Dec. 12, 2022.
Cloudian, "On-Premises Object Storage: Building S3 in Your Backyard", https://cloudian.com/guides/hybrid-it/on-premises-object-storage/, accessed Dec. 12, 2022.
Cloudian, "S3 Backup: The Complete Guide", https://cloudian.com/blog/s3-backup-the-complete-guide/, accessed Dec. 12, 2022.
Cloudian, "Simple, Secure, Scalable. S3-Compatible, Cloud Native Data Management", https://cloudian.com/products/hyperstore/, accessed Dec. 12, 2022.
Netapp, "StorageGRID: Smart, fast, future-proof object storage", https://www.netapp.com/data-storage/storagegrid/, accessed Dec. 12, 2022.
Final Office Action on U.S. Appl. No. 17/150,081 dated Feb. 10, 2023.
Final Office Action on U.S. Appl. No. 17/358,967 dated Feb. 22, 2023.
OpenStack. Openstack Object Storage Api V1 Reference—API V1 .<https://docs.huinoo.com/openstack/archive/api/openstack-object-storage/1.0/os-objectstorage-devguide-1.0.pdf>.2014. (Year: 2014).
Rivkind, Yael. Object Storage: Everything You Need To Know. <https://lakefs.io/blog/object-storage/>Nov. 25, 2020. (Year: 2020).

\* cited by examiner

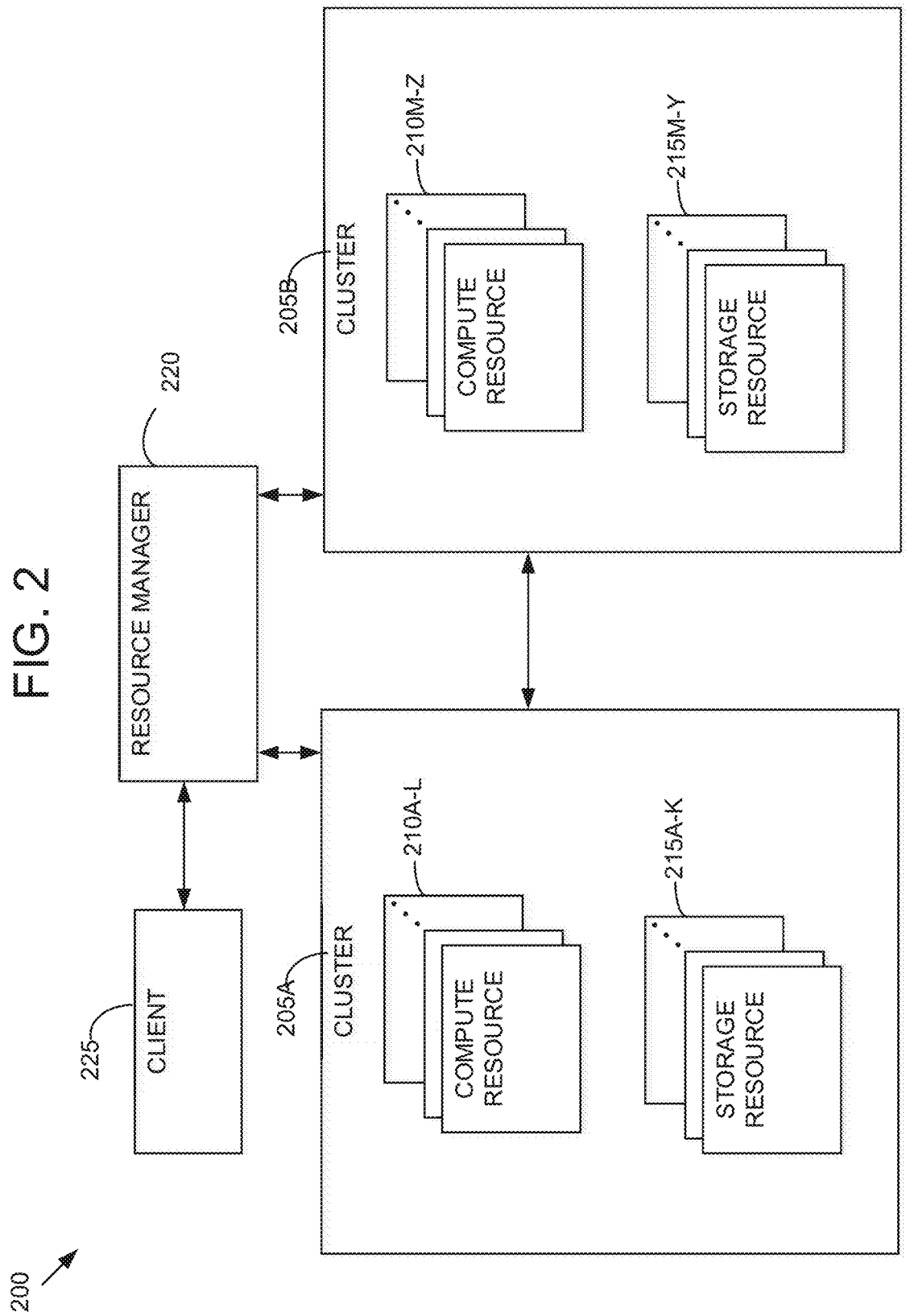

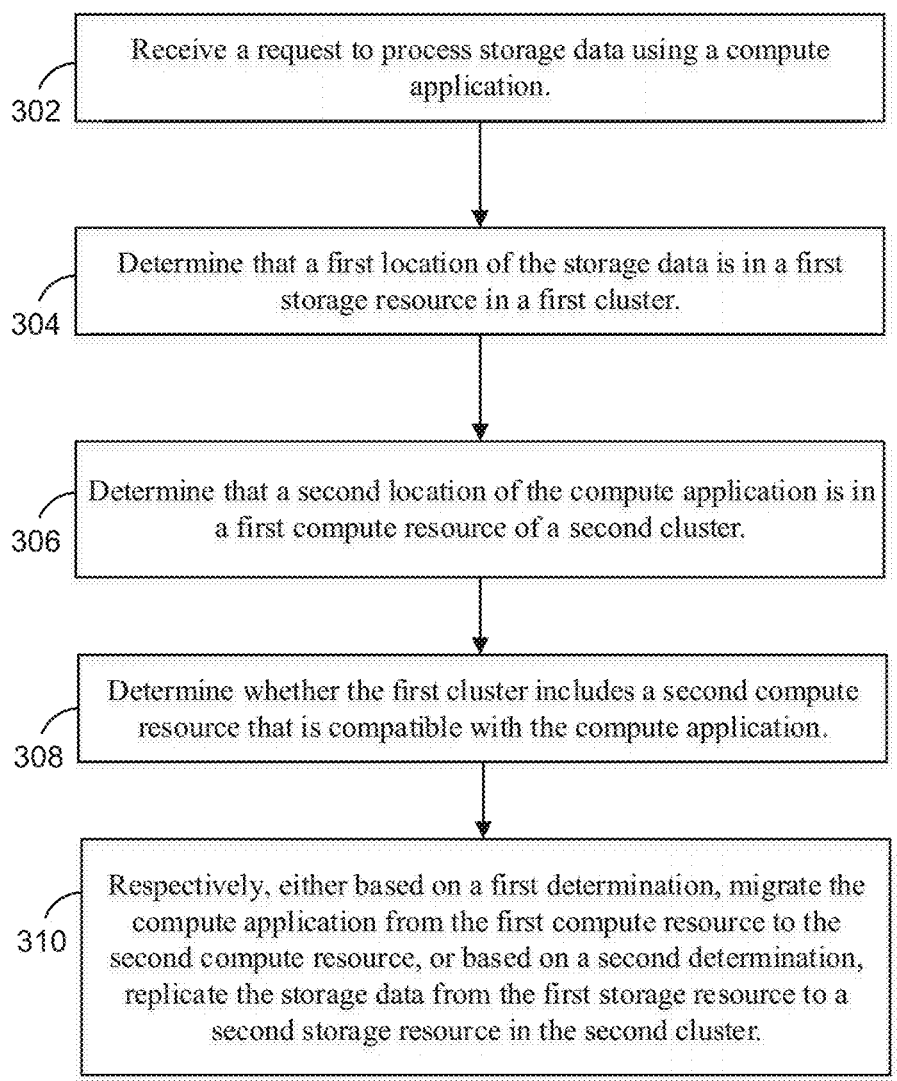

SYSTEM AND METHOD FOR HYPERCONVERGENCE AT THE DATACENTER

CROSS-REFERENCE TO RELATED APPLICATION

This application is related to and claims priority under 35 U.S. § 119(e) from Indian Provisional Application No. 201941050392, filed Dec. 6, 2019, titled "SYSTEM AND METHOD FOR HYPERCONVERGENCE AT THE DATACENTER," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for multi-cluster storage expansion.

An illustrative embodiment disclosed herein is an apparatus including a processor with programmed instructions to receive a request to process storage data using a compute application, determine that a first location of the storage data is in a first storage resource in a first cluster of compute, storage, and network resources, determine that a second location of the compute application is in a first compute resource of a second cluster of compute, storage, and network resources, determine whether the first cluster includes a second compute resource that is compatible with the compute application, and respectively, either, based on a first compatibility determination, migrate the compute application from the first compute resource to the second compute resource, or, based on a second compatibility determination, replicate the storage data from the first storage resource to a second storage resource in the second cluster.

In some embodiments, the first compatibility determination includes that the second compute resource is compatible with the compute application. In some embodiments, the second compatibility determination includes that the second compute resource is not compatible with the compute application. In some embodiments, one of the first and second cluster is a private cluster, and the other of the first and second cluster is a public cluster. In some embodiments, the first location is exposed through a first API and the second location is exposed through a second API. In some embodiments, the first and second location are part of a single namespace. In some embodiments, the first storage resource and the second storage resource belong to a distributed object store.

Another illustrative embodiment disclosed herein is a non-transitory computer readable storage medium having instructions stored thereon that, upon execution by a processor, causes the processor to perform operations including receiving a request to process storage data using a compute application, determining that a first location of the storage data is in a first storage resource in a first cluster of compute, storage, and network resources, determining that a second location of the compute application is in a first compute resource of a second cluster of compute, storage, and network resources, determining whether the first cluster includes a second compute resource that is compatible with the compute application, and respectively, either, based on a first compatibility determination, migrating the compute application from the first compute resource to the second compute resource, or, based on a second compatibility determination, replicating the storage data from the first storage resource to a second storage resource in the second cluster.

Another illustrative embodiment disclosed herein is a computer-implemented method including receiving, by a processor, a request to process storage data using a compute application, determining, by the processor, that a first location of the storage data is in a first storage resource in a first cluster of compute, storage, and network resources, determining, by the processor, that a second location of the compute application is in a first compute resource of a second cluster of compute, storage, and network resources, determining, by the processor, whether the first cluster includes a second compute resource that is compatible with the compute application, and respectively, either, based on a first compatibility determination, migrating, by the processor, the compute application from the first compute resource to the second compute resource, or, based on a second compatibility determination, replicating, by the processor, the storage data from the first storage resource to a second storage resource in the second cluster.

Further details of aspects, objects, and advantages of the invention are described below in the detailed description, drawings, and claims. Both the foregoing general description and the following detailed description are exemplary and explanatory, and are not intended to be limiting as to the scope of the invention. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 2 is an example block diagram of a multi-cluster environment, in accordance with some embodiments of the present disclosure.

FIG. 3 is a flowchart of an example method for implementing hyperconvergence at the data center, in accordance with some embodiments of the present disclosure.

Figure 1:
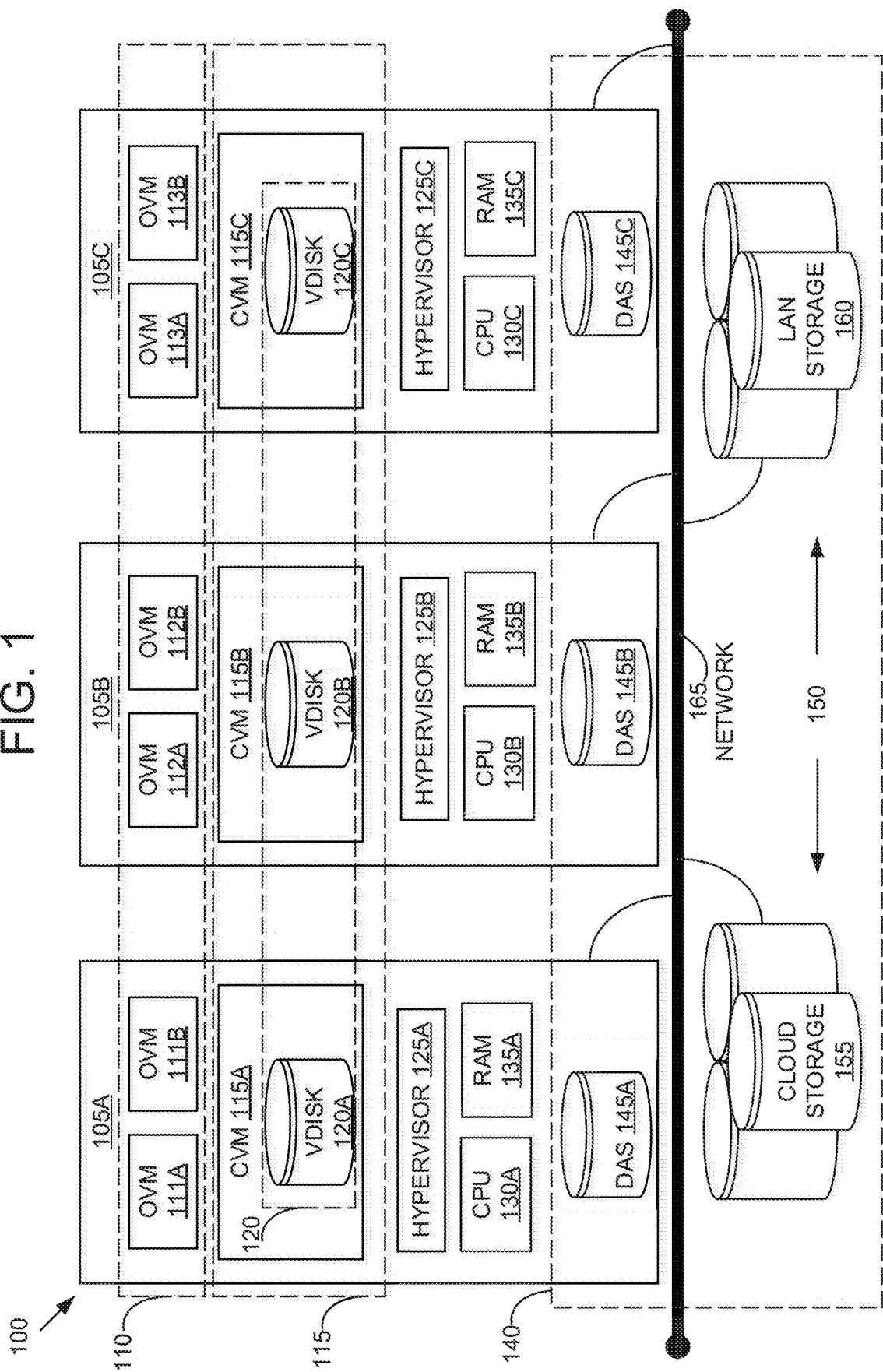
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Enterprises today creates silos across geographies and clusters. Because compute and storage resources are spread out, this approach is wasteful, avoids richer analytics and data processing, and results in lower data throughput, higher latency, and more network hops. This approach is not flexible or adaptive enough to adequately handle the dynamic nature of storage and compute resources that may be created or moved on the fly from one network location to the other. Moreover, this approach does not scale well, especially with computationally intensive or data intensive workloads. Other enterprises force customers to move data to public clouds. This can be prohibitively expensive for customers. What is needed is an approach that leverages data locality to improve efficient use of compute, storage, and network resources without exceeding reasonable cost.

Some embodiments of the present disclosure include an infrastructure which provides the single namespace and locality for application convergence. The single namespace is across a federation of public and private clusters. The single namespace allows intelligent access of data location information anywhere. The data location information can be accessed through an API. The data location information can be used to provide read locality such as smart caching, write locality, storage locality such as local buckets for object storage, and local compute placement. Locality offers better efficiency of resource usage, allows for compute, storage, and network convergence at the multi-cluster or datacenter level, and results in better performance and cost savings.

Virtualization Technology and Environment

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMs 135 and/or the storage pool 140. The virtualization of the underlying hardware is described below.

In some embodiments, the CVMs 115 may be configured to run a distributed operating system in that each of the CVMs 115 run a subset of the distributed operating system. In some embodiments, the CVMs 115, and the underlying storage of the nodes (e.g., nodes 105) on which the CVMs 115 are running, form one or more storage clusters (e.g., Nutanix Operating System ("NOS") clusters). In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer. For sake of brevity, the storage clusters (e.g., NOS clusters) are herein referred to as clusters.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. The OVMs in the OVM cluster may be configured to run software-defined object storage service, such as Nutanix Buckets™. The OVM cluster may be configured to create buckets, add objects to the buckets, and manage the buckets and objects. In some embodiments, the OVM cluster include greater than or fewer than the OVMs 110.

Multiple OVM clusters and/or multiple NOS clusters may exist within a given virtual computing system (e.g., the virtual computing system 100). The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single standalone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

Objects are collections of unstructured data that includes the object data and object metadata describing the object or the object data. A bucket is a logical construct exposed to users that contains the objects. A deployment can have multiple buckets. The buckets are backed by vdisks, which are backed by an underlying storage, such as a storage pool, a NOS container, a SAN, or a NAS. In some embodiments, a vdisk appears to the bucket, a CVM, or other VM, as a SAN or NAS storage. The bucket/CVM reads or writes to the vdisk using, for example, SCSI or NFS protocol. In some embodiments, the vdisk encapsulates the SCSI commands in iSCSI and sends the iSCSI commands across the network to the SAN hardware that is backing the vdisk. In some embodiments, the vdisk encapsulates and/or forwards the NFS commands across the network to the NAS storage that is backing the vdisk.

Object storage service (OSS), is a layered service being built over NOS. OSS uses the power of the NOS offering and builds an efficient and scalable object store service on top. Users (e.g., clients, client devices or client applications) read and write objects to the OSS and use GET and PUT calls for read and write operations. In some embodiments, an entire object is written and partial writes, appends or overwrites are not permitted. For reads and writes, data flows through OSS components before being stored in NOS storage. The OSS may run on one or more OVMs, such as the OVMs 110. The OSS is herein referred to as the object layer.

Regions from vdisks, such as the vdisks 120, are allocated to buckets. A region provides the high-level mapping between at least one of an object or a bucket and the corresponding locations on a vdisk (e.g., a vDisk ID, vdisk offset, and vdisk length). Vdisks may be subdivided (e.g. chunked) into multiple fixed-size regions. A region can include portions (e.g., portions, chunks, blocks, locations) of multiple vdisks.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Hyperconvergence at the Datacenter

Referring now to FIG. 2, a multi-cluster environment 200 is shown, in accordance with some embodiments of the present disclosure. The multi-cluster environment 200 includes a plurality of clusters, such as clusters 205A and 205B (collectively, referred to as "clusters 205"), that are coupled to each other. Each of the clusters includes a plurality of compute resources and storage resources. For example, the cluster 205A includes compute resources 210A-210L and storage resources 215A-215K, and the cluster 205B includes compute resources 210M-210Z and storage resources 215M-215Y. The compute resources are collectively referred to as "compute resources 210" and the storage resources are collectively referred to as "storage resources 215." Compute resources include processors such as CPU 130A with respect to FIG. 1, RAM, etc. Storage resources include physical disks, virtual disks, buckets, any of the components of the storage pool 140 with respect to FIG. 1, etc. The multi-cluster environment 200 includes a resource manager 220 that is coupled to each of the clusters 205. The multi-cluster environment 200 includes a client 225 that is coupled to the resource manager 220.

In some embodiments, at least one of the clusters 205 is a private cluster. In some embodiments, at least one of the clusters 205 is a public cluster (e.g., a public cloud). In some embodiments, the clusters 205 are in a same datacenter (e.g., site). In some embodiments, the cluster 205A is in a first datacenter and the cluster 205B is in a second datacenter. In some embodiments, each of the clusters includes a virtual computing system 100, or some components form the virtual computing system 100. In some embodiments, the multi-cluster environment 200 (e.g., the clusters 205 in the multi-cluster environment 200) includes greater than two clusters.

The resource manager 220 includes a processor having programed instructions (herein, the resource manager 220 includes programmed instructions) to manage (e.g., move, migrate, replicate, copy, clone, monitor, send out alerts for, etc.) resources (e.g., the compute resources 210, the storage resources 215, network resources, etc.). The resource manager 220 includes programmed instructions to receive resource requests. The resource requests may be from the client 205 (e.g., a user, an application, a cluster, a node, a virtual machine, etc.). The resource request may be a request to process (e.g., compute, calculate, determine, run, etc.) storage data (e.g., object storage data, file system data, database data, containerized data, etc.) using a compute application (e.g., a program having computing capabilities, an application, an app, a desktop application, a web browser, a mobile app, an operating system, etc.). In some embodiments, the compute application is a set of instructions stored on a (e.g., non-transitory) computer readable medium that is processed by a processor such as the CPU 130A with respect to FIG. 1. The resource request may be done using an application programming interface (API).

The resource manager 220 includes programmed instructions to determine a cluster location for the storage data and the compute application. For example, the resource manager 220 includes programmed instructions to determine that the storage data is located in a first storage resource of a first cluster and the compute application is located in (e.g., in, coupled to, associated with, run by, processed by) a first compute resource of a second cluster. The locations, identifiers, and other information of the storage data and the compute application are exposed through APIs, such as representational state transfer (REST) APIs or remote procedure commands (RPCs). For example, the resource manager 220 includes programmed instructions to send a request (e.g., an API request, an API call) to an endpoint (e.g., the cluster 205A, a CVM on the cluster 205A such as the CVM 115A with respect to FIG. 1, etc.) to determine data and applications located in that cluster, and at which resources those data and applications are located. In some embodiments, the endpoint sends a response (e.g., responds, returns a response, etc.) to the request. In some embodiments, a first set of APIs is used to determine a location or other information of storage data, and a second set of APIs to determine location or other information of a compute application.

The resource manager 220 includes programmed instructions to determine whether the first cluster includes a second compute resource (e.g., a second compute resource located on the same cluster as the storage data) that is compatible with the compute application. If the resource manager determines that the second compute resource is compatible with the compute application, the resource manager 220 includes programmed instructions to migrate the compute application from the first compute resource to the second compute resource. If the resource manager determines that the second compute resource is not compatible with the compute application, the resource manager 220 includes programmed instructions to replicate the storage data from the first storage resource to a second storage resource in the second cluster.

In some embodiments, any clusters and their corresponding locations (e.g., the first and second location) and identifiers are part of a single (e.g., global) namespace. The knowledge of multiple OVM clusters and their configurations may be stored in the resource manager 220, a multi-cluster manager interfacing with the clusters, or some other component of a virtualization environment such as the virtual computing system 100 or the multi-cluster environment 200. For example, each cluster is given a cluster federation identifier (ID) and a resource manager 220 instance to join. Each cluster can keep a watch on the membership change of the federation. A single cluster can join multiple federations. On the resource manager 220, there can be three levels of information: federation membership information/ID, cluster information/ID, and bucket name/ID.

Each of the elements or entities of the virtual computing system 100 and the multi-cluster environment 200 (e.g., clusters 205, compute resources 210, storage resources 215, resource manager 220), is implemented using hardware, software, or a combination of hardware or software, in one or more embodiments. The elements or entities of the virtual computing system 100 and the multi-cluster environment 200 can include any application, program, library, script, task, service, process or any type and form of executable instructions executed by one or more processors (e.g., the CPU 130A), in one or more embodiments. Each of the one or more processors is hardware. The instructions may be stored on one or more computer readable and/or executable storage media including non-transitory storage media such as non-transitory storage media in the storage pool 140 with respect to FIG. 1.

Referring now to FIG. 3, a flowchart of an example method 300 for implementing hyperconvergence at the data center is illustrated. The method 300 may be implemented using, or performed by, a resource manager 220 or processor associated with the resource manager 220, which is detailed herein with respect to the virtual computing system 100 and the multi-cluster environment 200. Additional, fewer, or different operations may be performed in the method 300 depending on the embodiment.

A processor, such as the CPU 130A, associated with a resource manager, such as the resource manager 220, receives a request to process storage data using a compute application (302). The processor determines that a first location of the storage data is in a first storage resource in a first cluster of compute, storage, and network resources (304). In some embodiments, the first cluster is one of a private cluster and a public cluster. In some embodiments, the first storage resource belongs to a distributed object store.

The processor determines that a second location of the compute application is in a first compute resource of a second cluster of compute, storage, and network resources (306). In some embodiments, the second cluster is the other of a private cluster and a public cluster. In some embodiments, the first location is exposed through a first API and the second location is exposed through a second API. In some embodiments, the first and second location are part of a single namespace.

The processor determines whether the first cluster includes a second compute resource that is compatible with the compute application (308). The processor, respectively, either migrates the compute application from the first compute resource to the second compute resource based on a first compatibility determination, or replicates the storage data from the first storage resource to a second storage resource in the second cluster based on a second compatibility determination (310). In some embodiments, the first compatibility determination includes that the second compute resource is compatible with the compute application. In some embodiments, the second compatibility determination includes that the second compute resource is not compatible with the compute application. In some embodiments, the second storage resource belongs to the distributed object store.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed:

1. An apparatus comprising a processor and memory, wherein the memory comprises programmed instructions that, when executed by the processor, cause the apparatus to:
   maintain federation membership information of a federation of clusters sharing a single namespace, the federation including (a) a first cluster of host machines providing compute, storage, and network resources and (b) a second cluster of host machines providing compute, storage, and network resources;
   receive a request to process storage data using a compute application;
   determine that a first location of the storage data is in a first storage resource in the first cluster;
   determine that a second location of the compute application is in a first compute resource of the second cluster;
   determine whether the first cluster includes a second compute resource that is compatible with the compute application; and
   respectively, either:
      based on a first compatibility determination, migrate the compute application from the first compute resource to the second compute resource, or
      based on a second compatibility determination, replicate the storage data from the first storage resource to a second storage resource in the second cluster.

2. The apparatus of claim 1, wherein the first compatibility determination includes that the second compute resource is compatible with the compute application.

3. The apparatus of claim 1, wherein the second compatibility determination includes that the second compute resource is not compatible with the compute application.

4. The apparatus of claim 1, wherein one of the first cluster and second cluster is a private cluster, and the other of the first cluster and second cluster is a public cluster.

5. The apparatus of claim 1, wherein the first location is exposed through a first API and the second location is exposed through a second API.

6. The apparatus of claim 1, wherein the first storage resource and the second storage resource belong to a distributed object store.

7. The apparatus of claim 1, wherein the memory comprises the programmed instructions that, when executed by the processor, further cause the apparatus to:
   send a second request to a controller virtual machine (CVM) to determine that the first location of the storage data is in the first storage resource in the first cluster; and
   send a third request to the CVM to determine that the second location of the compute application is in the first compute resource of the second cluster.

8. The apparatus of claim 1, wherein migrating the compute application from the first compute resource to the second compute resource or replicating the storage data from the first storage resource to a second storage resource in the second cluster provides one or more of read locality, storage locality, or local compute placement.

9. The apparatus of claim 1, wherein the federation membership information includes a federation membership identifier (ID), a cluster ID, and a bucket ID.

10. The apparatus of claim 1, wherein the first cluster is part of multiple federations.

11. The apparatus of claim 1, wherein the host machines on the first cluster and the host machines on the second cluster are configured to run virtualization software including one of ESXi, AHV, or XenServer.

12. A non-transitory computer readable storage medium comprising instructions stored thereon that, upon execution by a processor, cause the processor to:
   maintain federation membership information of a federation of clusters sharing a single namespace, the federation including (a) a first cluster of host machines providing compute, storage, and network resources and (b) a second cluster of host machines providing compute, storage, and network resources;
   receive a request to process storage data using a compute application;

determine that a first location of the storage data is in a first storage resource in the first cluster;

determine that a second location of the compute application is in a first compute resource of the second cluster;

determine whether the first cluster includes a second compute resource that is compatible with the compute application; and respectively, either:
    based on a first compatibility determination, migrate the compute application from the first compute resource to the second compute resource, or
    based on a second compatibility determination, replicate the storage data from the first storage resource to a second storage resource in the second cluster.

13. The medium of claim 12, wherein the first determination includes that the second compute resource is compatible with the compute application.

14. The medium of claim 12, wherein the second determination includes that the second compute resource is not compatible with the compute application.

15. The medium of claim 12, wherein one of the first cluster and second cluster is a private cluster, and the other of the first cluster and second cluster is a public cluster.

16. The medium of claim 12, wherein the first location is exposed through a first API and the second location is exposed through a second API.

17. The medium of claim 12, wherein the first storage resource and the second storage resource belong to a distributed object store.

18. The medium of claim 12, comprising instructions stored thereon that, upon execution by a processor, further cause the processor to:
    send a second request to a controller virtual machine (CVM) to determine that the first location of the storage data is in the first storage resource in the first cluster; and
    send a third request to the CVM to determine that the second location of the compute application is in the first compute resource of the second cluster.

19. A computer-implemented method comprising:
    maintaining, by a processor, federation membership information of a federation of clusters sharing a single namespace, the federation including (a) a first cluster of host machines providing compute, storage, and network resources and (b) a second cluster of host machines providing compute, storage, and network resources;

receiving, by the processor, a request to process storage data using a compute application;

determining, by the processor, that a first location of the storage data is in a first storage resource in the first cluster;

determining, by the processor, that a second location of the compute application is in a first compute resource of the second cluster;

determining, by the processor, whether the first cluster includes a second compute resource that is compatible with the compute application; and respectively, either:
        based on a first compatibility determination, migrating, by the processor, the compute application from the first compute resource to the second compute resource, or
        based on a second compatibility determination, replicating, by the processor, the storage data from the first storage resource to a second storage resource in the second cluster.

20. The method of claim 19, wherein the first compatibility determination includes that the second compute resource is compatible with the compute application.

21. The method of claim 19, wherein the second compatibility determination includes that the second compute resource is not compatible with the compute application.

22. The method of claim 19, wherein one of the first cluster and second cluster is a private cluster, and the other of the first cluster and second cluster is a public cluster.

23. The method of claim 19, wherein the first location is exposed through a first API and the second location is exposed through a second API.

24. The method of claim 19, wherein the first storage resource and the second storage resource belong to a distributed object store.

* * * * *